Jan. 18, 1944.  M. L. LE GRO ET AL  2,339,642
COMBINATION WATER SUPPLY AND LEVEL CONTROL FOR STORAGE BATTERIES
Filed Aug. 11, 1941
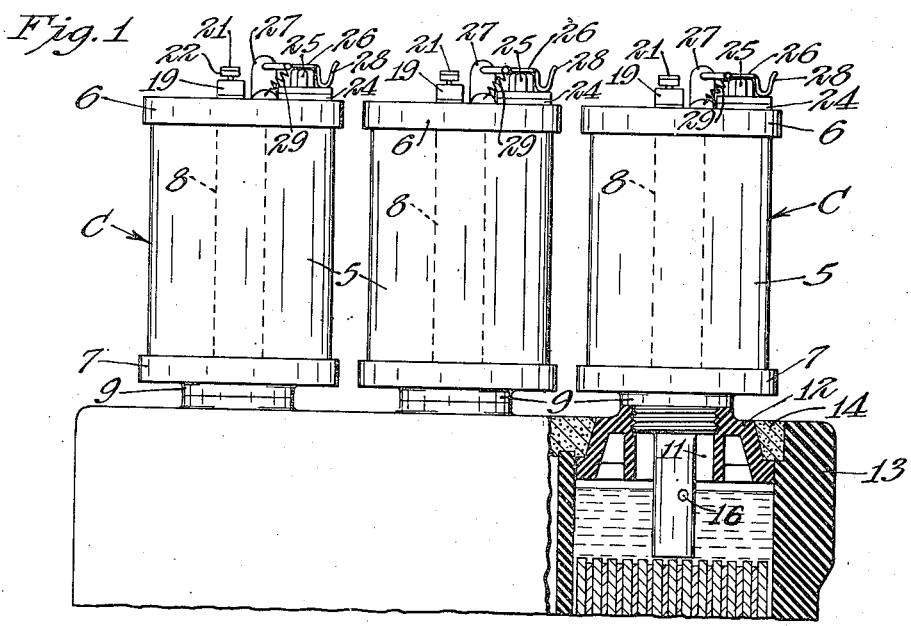
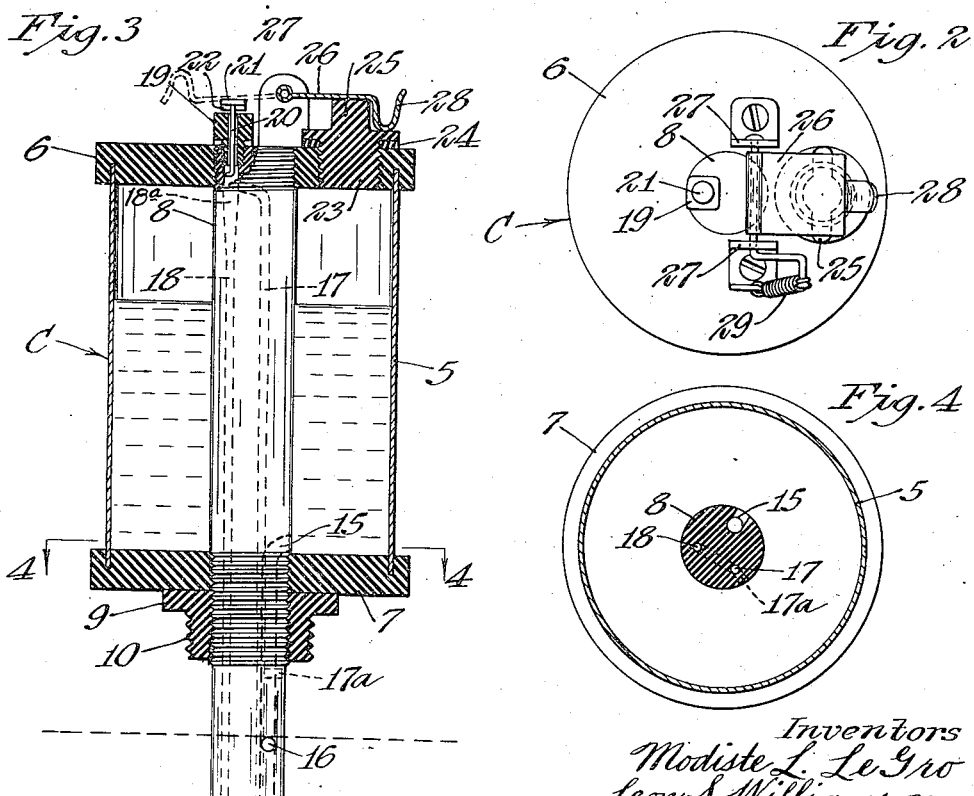
Inventors
Modiste L. Le Gro
Leon S. Williamson
By Williamson & Williamson
Attorneys Patented Jan. 18, 1944

2,339,642

UNITED STATES PATENT OFFICE 2,339,642

COMBINATION WATER SUPPLY AND LEVEL CONTROL FOR STORAGE BATTERIES

Modiste L. Le Gro and Leon S. Williamson, Minneapolis, Minn.

Application August 11, 1941, Serial No. 406,340

3 Claims. (Cl. 136—162)

This invention relates to devices for supplying distilled water to the interiors of storage batteries and for maintaining the proper level of the electrolyte within the battery.

It is one of the objects of our invention to provide a device as set forth above which can be mounted on the battery in the place of the ordinary filler cap and left in that position and so arranged that the battery can be tested with a hydrometer without removing the water supply device from the battery.

It is another object of our invention to provide a device which will automatically feed water into the interior of the battery and stop the feed when the electrolyte has reached a pre-determined level without the use of cut offs with moving parts.

Another object of the invention is to provide a device with a system of conduits for feeding water to the battery and venting gases therefrom and additionally to provide means for closing off the vent when filling the water supply container with additional water to prevent water from the container from excessively filling the battery.

Still a further object of the invention is to provide a water supply and level control device which fits in the filler opening of the battery and which has a removable adaptor so that different sizes of adaptors can be used for different sizes of filler openings.

These and other objects and advantages of the invention will more fully appear from the following description made in connection with the accompanying drawing, wherein like reference characters refer to the same parts throughout the views, and, in which:

Fig. 1 is a fragmentary elevation of a storage battery with a portion broken away and with an embodiment of our invention mounted thereon;

Fig. 2 is a plan view of one unit of the device;

Fig. 3 is a vertical sectional view; and

Fig. 4 is a section taken approximately on the line 4—4 of Fig. 3.

In the drawing there is illustrated a water container C having a side wall 5 which may be formed from a transparent plastic, an upper end wall 6 and a lower end 7. The container has a post 8 of dielectric material extending therethrough, the upper end of said post being threaded into the upper end 6 of the container and the lower portion of said post 9 being threaded through the container bottom 7 and extending therebelow a considerable distance. Threaded on the lower portion of the post 8 is a fitting 9 having an external threaded portion 10, said external threaded portion being adapted to screw into the upper portion of a battery filler opening 11, said opening being formed in the cell top 12. Of course, the battery is provided with an outer case 13 and a sealing compound 14 is used to seal the tops of the cells.

A liquid supply conduit 15 extends from a point adjacent the lower interior of the container C downwardly through the post 8 and through the bottom of said post as indicated by the heavy dotted lines in Fig. 3. The supply conduit 15 has a branch 16 which extends through the side of the post 8 a short distance above the bottom of said post and it is located at the maximum height to which the battery is to be filled as shown in Fig. 1.

A vent conduit 17 extends upwardly substantially throughout the length of the post 8 and at its upper end communicates with the upper portion of a test conduit 18. A single conduit extends from the junction of the conduits 17 and 18 upwardly through the upper end of the post 8. Threaded into the upper end of this common conduit is a plug which has a central longitudinal bore to receive a shank 20 which is slidable therein. As shown in Fig. 3, the lower end of the shank is bent over to prevent it from being lifted out of the plug 19 and the upper end of said shank 20 is provided with a head 21 having a packing member 22 on its lower side. When the unit comprising the shank 20, head 21 and packing 22 is pressed down on the top of the plug 19, the vent conduit 17 and test conduit 18 are closed to the outer atmosphere.

The upper end of the casing C is provided with a filler aperture closed by a screw plug 23 which has a packing ring 24 associated therewith. The plug 23 has a wing-like finger grip portion 25 and when the plug is tightened in the filler aperture the wing member 25 is adapted to lie in approximately the position shown in Fig. 2. A latch element 26 is pivotally secured between a pair of brackets 27, and said latch element 26 is provided with a bent-end portion 28, and said latch member is adapted to overlie the wing-like finger grip portion 25 and down one side thereof to prevent the plug 23 from twisting due to vibration of the battery as in a motor vehicle. A spring 29 normally holds the device in the position shown in Figs. 1, 2, and the full line position of Fig. 3. However, the latch member 26 can be swung to the dotted line position of Fig. 3 so that the plug 23 can be unscrewed and in said dotted line position the latch 26 overlies and presses down upon the vent seal made up of the shank 20, head 21, packing 22.

When the device has been installed on a battery, the plug 23 is removed from the upper end of the water container C and water poured into said container. During this operation the catch member 26 overlies and presses down upon the vent seal 21, 22 to close the same from the outer atmosphere. If the solution in the battery is low, water will run from the container C through the filler conduit 15 until the liquid level in the battery rises to the filler conduit branch 16. After the liquid covers the branch conduit 16 it will stop rising in the battery due to the fact that there is no air outlet from the interior of the cell, the vent conduit 17 and test conduit 18 being closed at their upper ends. The plug 23 is then screwed down tightly in the top 6 of the container C and the catch member 26 swung from the dotted line to the full line position shown in Fig. 3. If there is any air or gas pressure in the battery it will be relieved past the vent seal 21, 22 which is of light material and easily displaced. The insertion of the plug 23 will prevent more water from running from container C until the solution in the battery drops below the filler conduit branch 16. At such time liquid is discharged into the cell and air enters the container C. This keeps a constant level of liquid in the battery cell.

Gas is generated in the battery during its normal function and it escapes to the outer atmosphere through the vent conduit 17, this gas entering the conduit through a branch 17a which is shown in Fig. 3 to be above the controlled maximum level of liquid in the battery. It will be seen that the conduit 17 extends down through the bottom of the post 8. Bubbles form on the solution and enter the vent branch 17a, but as they enter the main vent line 17 they will break and the moisture will fall down through the lower portion of the vent line 17 below the vent branch 17a. It sometimes happens that moisture enters the upper portion of the vent conduit 17 and in that case when it reaches the junction of the vent conduit 17 and test conduit 18 it will fall down the test conduit 18 and return to the interior of the battery.

It should be further noted that the test conduit 18 is flared somewhat at its upper end as shown at 18a in Fig. 3. In order to test the battery the vent seal plug 19 is removed and the rubber tube on the end of a hydrometer is inserted in the upper end of said test conduit until it jams in the more constricted portion of the tapered test conduit. When this happens a seal is formed so that solution can be drawn from the battery upwardly through the test conduit 18 and into the hydrometer.

From the foregoing description it will be seen that we have provided a device for supplying water to and maintaining the liquid level in storage batteries wherein no movable shut off valves are utilized to stop the flow from the supply container to the battery. Efficient venting means is provided which is closed to the extent that no foreign material can get in the battery and at the same time gases can readily escape. We have also provided improved means for testing the solution in the battery without removing the device and without contaminating the water in the supply container C. In order to maintain the capillary feed control when a new supply of water is being put into the container C we have provided means for closing the vent conduits during the filling operation and this means is so arranged that the vent valve is positively closed in order to gain access to the filler opening of the supply container.

It will, of course, be understood that various changes may be made in the form, details, arrangement and proportions of the various parts without departing from the scope of our invention.

What is claimed is:

1. In a water supply and level control for storage battery cell having plates therein and a filler opening located above the plates, a water container having a portion adapted to fit and be supported in said filler opening, a conduit affording flow communication between the interior of said container and the interior of said battery cell, a vent conduit extending from the upper interior portion of said cell to an outer upper portion of the container and sealed from the interior of said container, a closure for said vent at its upper end, said closure being movable to open said vent conduit under the influence of gas pressures within said battery and being normally closed in the absence of said pressures to prevent air from flowing through said vent conduit, a filler opening in said container having a cap normally closing the same, a movable securing device movable to one position to prevent displacement of said cap, and said securing device being movable to a second position to free said cap for removal and in said second position being adapted to engage said vent closure to prevent displacement thereof while adding a new supply of water through said container filler opening.

2. In a water supply and level control for storage batteries having plates therein and a filler opening located above said plates, a water container mounted in said filler opening, a vent conduit extending upwardly from a point above the normal maximum water level of the battery to a point exteriorly of said container and battery, a conduit extending from the lower portion of said chamber downwardly to a point approximately that of the normal level of water in said battery, a third conduit extending downwardly through the bottom of said container to a point adjacent and above the plates of said battery, the upper end of said third conduit extending exteriorly of said container, said third conduit being substantially straight to receive the flexible hose of a hydrometer whereby solution in a battery may be withdrawn to the hydrometer for testing without removing said container from said battery filler opening, and said third conduit communicating with said vent conduit intermediate the ends of said third conduit.

3. In a water supply and level control for storage batteries having plates therein and a filler opening located above said plates, a water container adapted to fit in said channel opening, a vent conduit extending upwardly from a point above the maximum water level of the battery to a point exteriorly of said container and said battery, a second conduit extending from the lower portion of said chamber downwardly to a point approximately that of the normal level of water in said battery, means normally closing said vent conduit from the outer atmosphere and movable to an open position under pressure of gases generated within said battery and flowing through said vent conduit, and a third conduit comprising a battery solution test conduit having communication with the interior of said battery and also communicating with said vent conduit, and said conduit closing means providing a closure for both said vent conduit and said solution test conduit.

MODISTE L. LE GRO.
LEON S. WILLIAMSON.